US008385825B2

(12) United States Patent
Emura

(10) Patent No.: US 8,385,825 B2
(45) Date of Patent: Feb. 26, 2013

(54) COMMUNICATION DEVICE

(75) Inventor: Masafumi Emura, Kiyose (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 558 days.

(21) Appl. No.: 12/400,105

(22) Filed: Mar. 9, 2009

(65) Prior Publication Data

US 2010/0081376 A1    Apr. 1, 2010

(30) Foreign Application Priority Data

Sep. 29, 2008 (JP) ................. P2008-250842

(51) Int. Cl.
H04B 5/00 (2006.01)
H04B 7/00 (2006.01)
(52) U.S. Cl. .............. 455/41.2; 455/41.1; 455/555
(58) Field of Classification Search ............ 455/73, 455/555, 41.2, 39, 75, 41.1
See application file for complete search history.

(56) References Cited

U.S. PATENT DOCUMENTS

| 5,485,463 | A * | 1/1996 | Godoroja | 370/333 |
| 7,352,998 | B2 * | 4/2008 | Palin et al. | 455/41.2 |
| 7,636,560 | B2 * | 12/2009 | Ku | 455/272 |
| 7,650,144 | B2 | 1/2010 | Nakamura | |
| 8,019,280 | B2 * | 9/2011 | Tsfaty et al. | 455/41.2 |

FOREIGN PATENT DOCUMENTS

| JP | 2004-364145 A | 12/2004 |
| JP | 2007-179555 A | 7/2007 |
| JP | 2007-193566 A | 8/2007 |

OTHER PUBLICATIONS

JP Office Action mailed on Jun. 19, 2012.

* cited by examiner

*Primary Examiner* — Dinh T. Le
(74) *Attorney, Agent, or Firm* — Maschoff Gilmore & Israelsen

(57) ABSTRACT

There is provided a communication device for communicating with a counterpart device, including: a first and a second short range communication modules; and a short range communication controller configured to: control the first short range communication module to exchange information with the communication device, determine whether file transmission between the counterpart device and the second short range communication module is properly done based on the information received from the counter part device, and control the second short range communication module to receive or transmit a file from or to the counterpart device based on a determination that the file transmission is properly done.

15 Claims, 10 Drawing Sheets

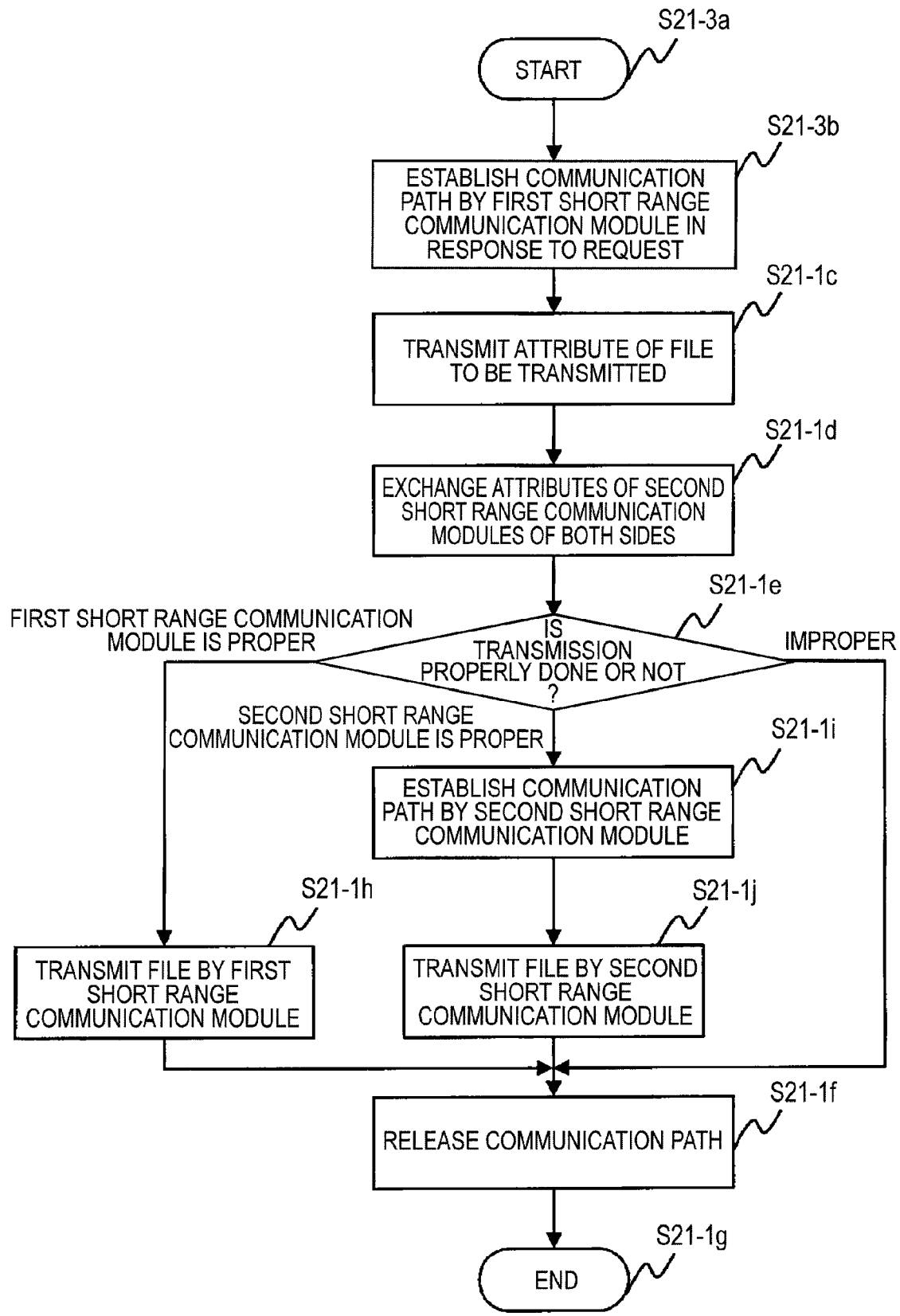

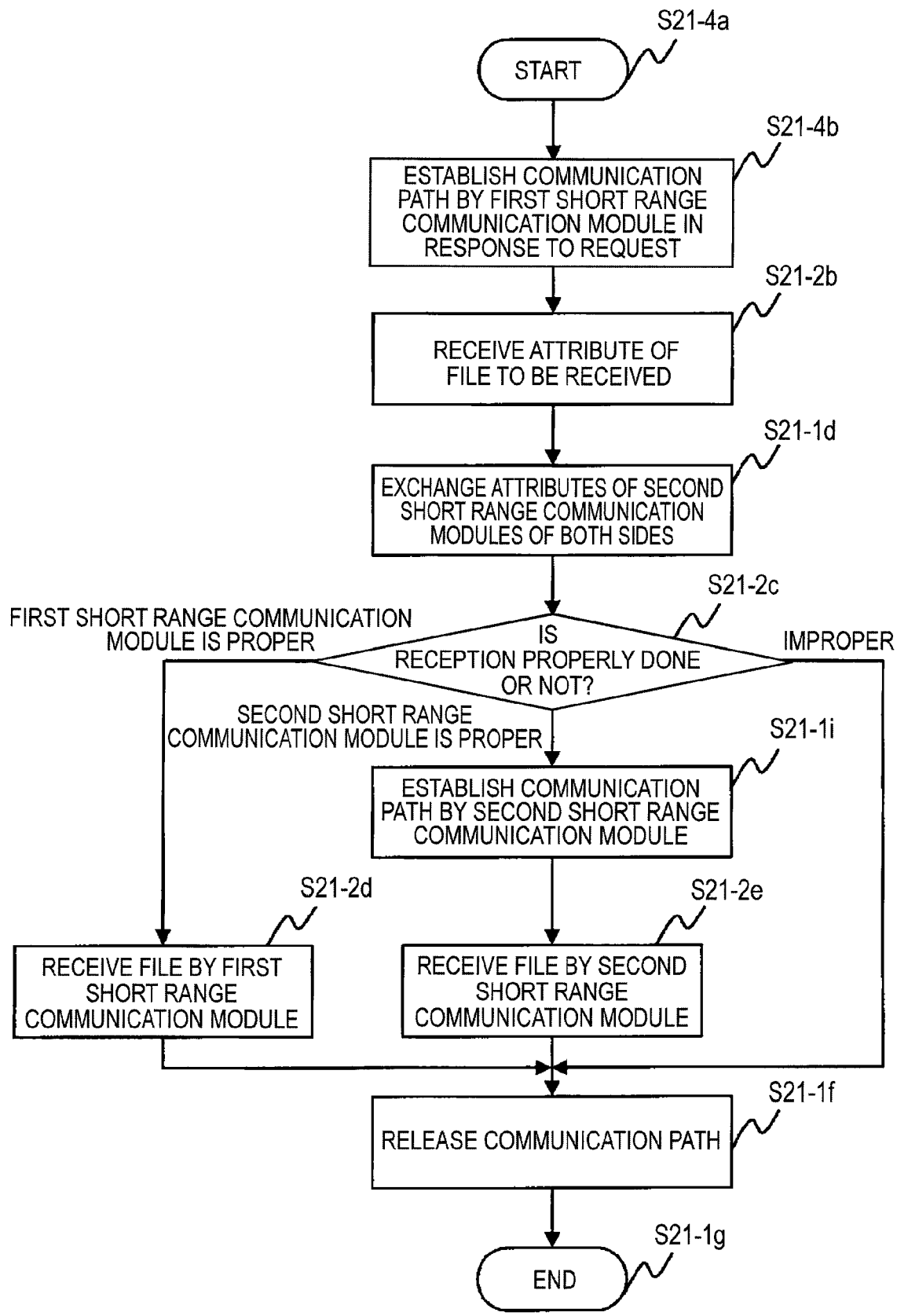

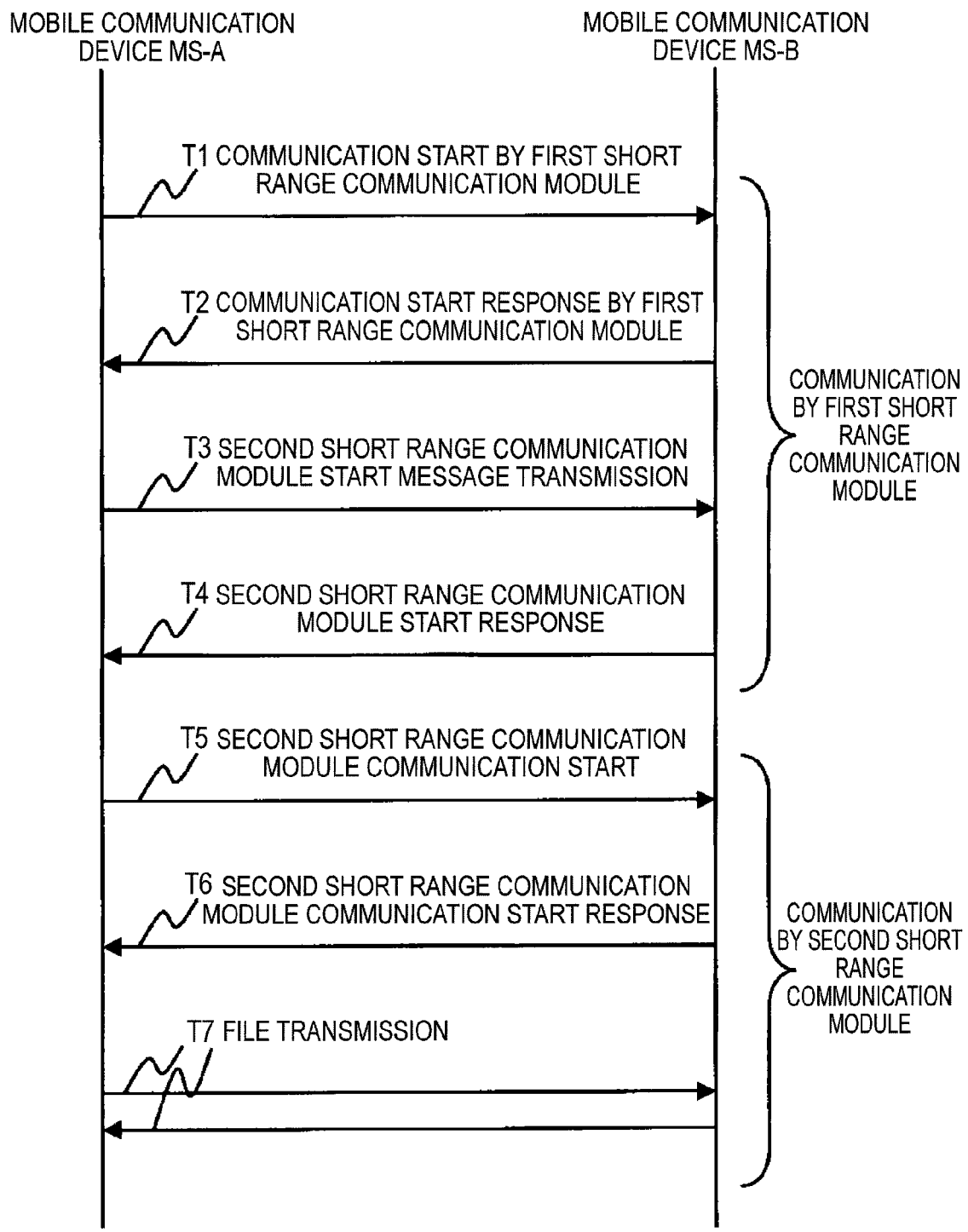

COMMUNICATION DEVICE

CROSS-REFERENCE TO RELATED APPLICATIONS

The entire disclosure of Japanese Patent Application No. 2008-250842 filed on Sep. 29, 2008, including specification, claims, drawings and abstract is incorporated herein by reference in its entirety.

BACKGROUND

1. Field of the Invention

One aspect of the present invention relates to a communication device, and more particularly, to a process for performing short range communication by reducing electric energy consumption.

2. Description of the Related Art

There are mobile communication devices performing short range communication in addition to communication through a mobile communication network. A communication device of a counterpart of short range communication, for example, a mobile communication device, transmits/receives an image file and/or an address book by short range communication, etc.

Since a mobile communication device is operated by power stored in a battery, reduction of electric energy consumed in relation to the short range communication is required. Thus, the short range communication is performed in two types of communication systems.

That is, first, in communication by a first short range communication system whose power consumption is low, an identifier, etc., required for communication by a second short range communication system of a communication counterpart device are mutually transmitted/received. Using the identifier, high-rate communication by the second short range communication system is performed.

One example of the first short range communication system is a Near Field Communication (hereinafter, referred to as NFC) system standardized by International Organization for Standardization/International Electrotechnical Commission Joint Technical Committee 1 (ISO/IEC JTC 1). One example of the second short range communication system is a Bluetooth system and a wireless LAN system.

A communication rate by the NFC system is not surely high, but when it waits for a radio wave to be transmitted from a counterpart, electric energy is not consumed. Therefore the electric energy to be consumed can be reduced (for example, see JP-A-2004-364145 (Pages 2-3 and FIGS. 13, 14, and 15)).

However, a method disclosed in JP-A-2004-364145 does not consider reduction of electric energy to be consumed until the second short range communication system (high-rate communication system) ends.

SUMMARY

There is provided a communication device for communicating with a counterpart device that is located within a communicable range, including: a first short range communication module configured to perform short range communication with the counterpart device; a second short range communication module configured to perform short range communication with the counterpart device, the second short range communication module being higher in communication rate and power consumption than the first short range communication module; a short range communication controller configured to: control the first short range communication module to exchange information with the counterpart device; determine whether file transmission between the counterpart device and the second short range communication module is properly done based on the information received from the counterpart device; and control the second short range communication module to receive or transmit a file from or to the counterpart device based on a determination that the file transmission is properly done.

BRIEF DESCRIPTION OF THE DRAWINGS

Embodiment may be described in detail with reference to the accompanying drawings, in which:

FIG. 8 is an exemplary flowchart of an operation in which the short range communication controller causes a file to be transmitted based on a request received by a first short range communication module;

FIG. 9 is an exemplary flowchart of an operation in which the short range communication controller causes a file to be received based on a request received by the first short range communication module; and FIG. 10 is one example of a sequence of communication between two mobile communication devices to be performed by the short range communication controller.

DETAILED DESCRIPTION OF THE EMBODIMENTS

Figure 1:
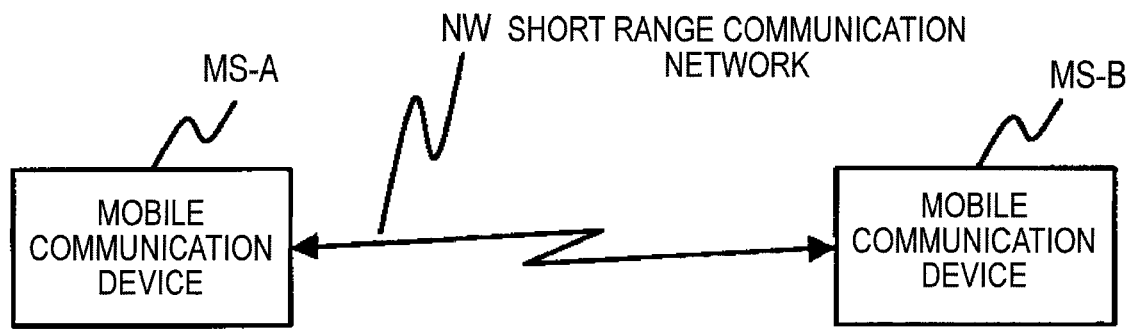
FIG. 1 is an exemplary block diagram showing a configuration of a communication system including a mobile communication device according to an embodiment of the present invention.

FIG. 1 is a block diagram showing a configuration of a communication system including a mobile communication device according to an embodiment of the present invention.

The communication system includes a mobile communication device MS-A and a mobile communication device MS-B connected through a short range communication network NW. Here, the mobile communication device MS-A and the mobile communication device MS-B are connected through the short range communication network NW in a near field, for example, when they are located at a distance less than or equal to several centimeters. Since the mobile communication device MS-A and the mobile communication device MS-B have the same configuration and perform the same operation, the configuration and operation of the mobile communication device MS-A will be described hereinafter.

Figure 2:
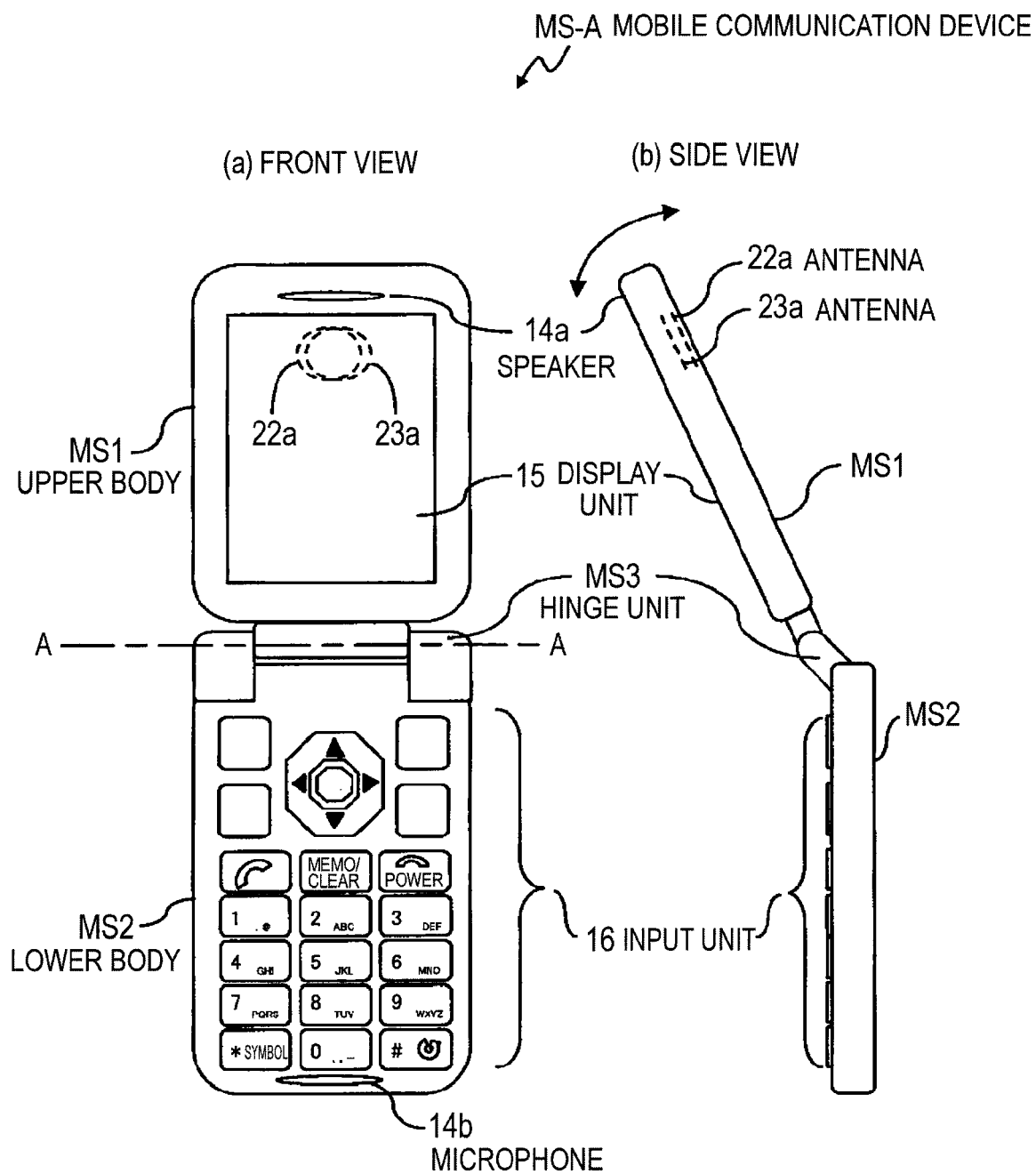
FIG. 2 is an exemplary external view of the mobile communication device when the mobile communication device is opened.

FIG. 2 shows an external view when the folding of upper and lower bodies of the mobile communication device MS-A is open. The mobile communication device MS-A is a freely openable/closable folding-type device. In FIG. 2, section (a) shows a front view and section (b) shows a side view.

The mobile communication device MS-A includes an upper body MS1, a lower body MS2 and a hinge unit MS3 connecting the upper body MS1 and the lower body MS2. Therefore, the upper body MS1 and the lower body MS2 are freely pivotable at the center of an axis A-A and an angle of the upper body MS1 and the lower body MS2 is variable between about 0 degree (closed state) and about 180 degrees (open state).

On an inner surface of the upper body MS1, there are arranged a speaker 14a used for voice reception and a display unit 15 including a Liquid Crystal Display (LCD) equipped with a backlight. The display unit 15 displays a message or an image to prompt a user to operate, and/or content operated by the user, a cursor, an operating state of the device, etc.

In an inner part of the upper body MS1, an antenna 22a and an antenna 23a are arranged to transmit/receive a radio wave for communication through the short range communication network NW. The antenna 22a and the antenna 23a are arranged closely and installed such that directivities are directed to the same direction of an outer face of the upper body MS1. It is preferred that the directivity of the antenna 22a and the directivity of the antenna 23a have the same degree. Here, the degree of the directivity is the degree of sharpness of the directivity, in other words, the degree of dullness of the directivity.

FIG. 2 shows the antenna 22a and the antenna 23a as a circular loop antenna, but this is one example and may be a loop antenna of a polygon, for example, a tetragon. The antenna is not limited to the loop antenna. Any system antenna may be used. No restriction is imposed on sizes of the antenna 22a and the antenna 23a by FIG. 2. No restriction is imposed on positions of the upper and lower bodies MS1 and MS2 and the hinge unit MS3 at which the antenna 22a and the antenna 23a are arranged.

FIG. 2 shows the antenna 22a and the antenna 23a separated slightly and arranged in a left-right direction and a front-back direction, but this is to make it possible to easily understand the drawing. Relative positions of the antenna 22a and the antenna 23a have requirements that directivities of both the antennas are the same in practice and sharpness of the directivities are at the same degree in practice, and no restriction is imposed on others. The antenna 22a and the antenna 23a are not limited to the same system antenna and the same shape.

On the inner surface of the lower body MS2, a microphone 14b used for voice transmission is installed. On the inner surface of the lower body MS2, an input unit 16 including a keypad is installed. In an inner part of the lower body MS2, an antenna used to transmit/receive a radio wave for communication through the mobile communication network is installed.

The input unit 16 is installed on the inner surface of the lower body MS2 and includes numeric keys used to input numerals and/or characters, symbols, etc. and a plurality of function keys used to input operation commands of on/off of power of the mobile communication device MS-A, etc.

Figure 3:
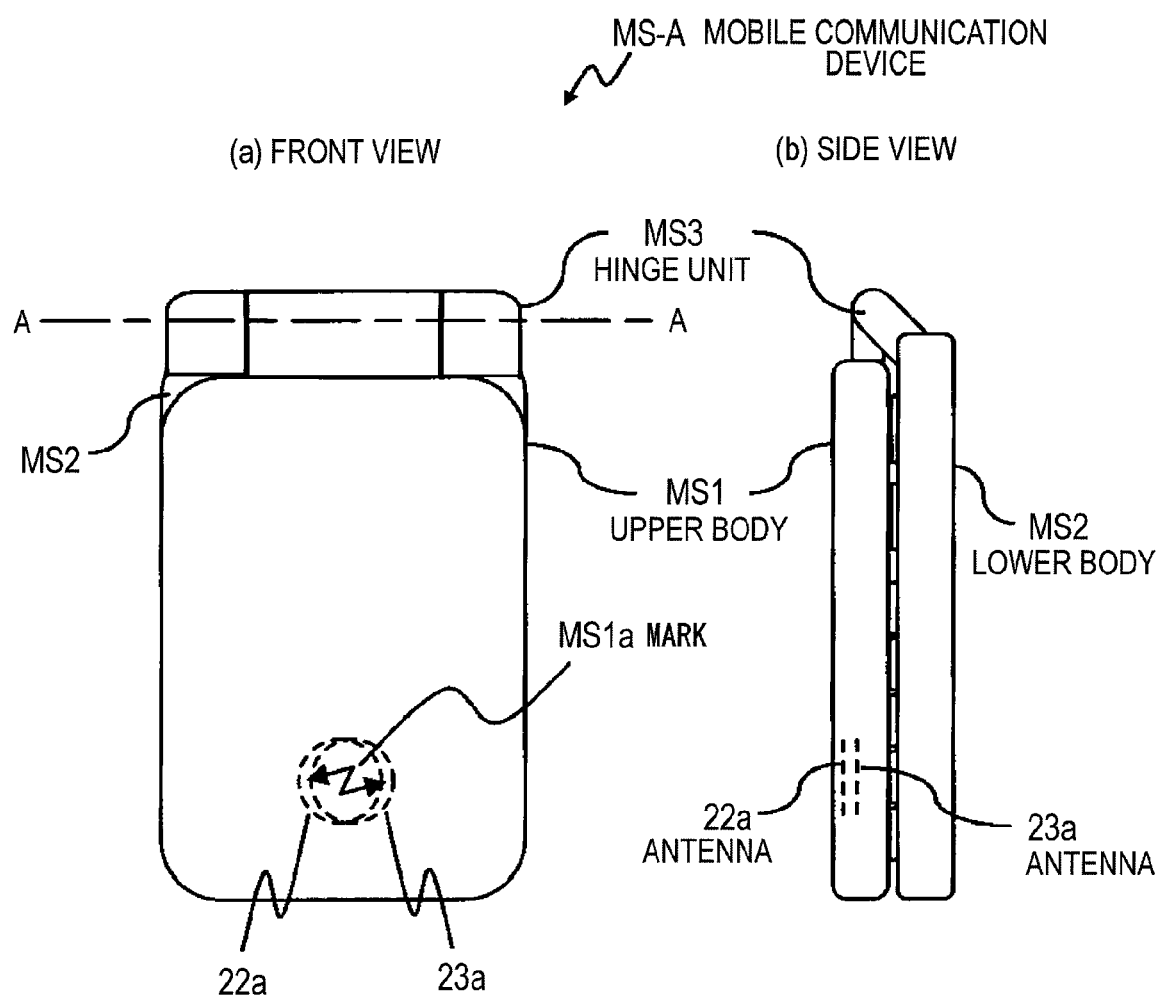
FIG. 3 is an exemplary external view of the mobile communication device when the mobile communication device is folded.

FIG. 3 shows an external view when the folding is closed closely to the lower body MS2 by pivoting the upper body MS1 of the mobile communication device MS-A by the hinge unit MS3, wherein section (a) shows a front view and section (b) shows a side view.

On the outer surface of the upper body MS1, a mark MS1a is printed at a position close to the antenna 22a and the antenna 23a, specifically, a position to which the directivity of a radio wave to be transmitted/received by the antenna 22a and the antenna 23a is directed. In FIG. 3, the mark MS1a of a lightning shape is illustrated, but the mark MS1a is optional and preferred to be a character, symbol, or image associated with communication through the short range communication network NW.

As described later, a radio wave to be transmitted (received) by the antenna 22a of the mobile communication device MS-A is received (transmitted) by the antenna 22a of the mobile communication device MS-B. A radio wave to be transmitted (received) by the antenna 23a of the mobile communication device MS-A is received (transmitted) by the antenna 23a of the mobile communication device MS-B.

In order to perform good communication using a radio wave to be transmitted/received by the antenna 22a or the antenna 23a, a condition is needed that the directivity of the antenna 22a and the antenna 23a of the mobile communication device MS-A and the directivity of the antenna 22a and the antenna 23a of the mobile communication device MS-B face each other and a distance between the antenna 22a and the antenna 23a of the mobile communication device MS-A and the antenna 22a and the antenna 23a of the mobile communication device MS-B is short, for example, within several centimeters.

For example, when the mobile communication device MS-B starts a sequence of transmission/reception of radio waves by receiving a radio wave transmitted from the mobile communication device MS-A, a user of the mobile communication device MS-B closes the upper and lower bodies MS1 and MS2 of the mobile communication device MS-B, sets it on a desk or holds it in the hand with the upper body MS1 to an upper side. A user of the mobile communication device MS-A opens the upper and lower bodies MS1 and MS2 of the mobile communication device MS-A and puts the mark MS1a of the upper body MS1 of the mobile communication device MS-A close to the mark MS1a of the mobile communication device MS-B. Then, a certain key operation at the input unit 16 of the mobile communication device MS-A can be performed. This situation can easily satisfies the above-described condition and the mobile communication device MS-A can input a command from the user through the input unit 16. The above-described condition is also satisfied by the situation that the user input a command through the input unit 16, then the upper and lower bodies MS1 and MS2 of the mobile communication device MS-A are closed and the mark MS1a of the mobile communication device MS-A is close to the mark MS1a of the mobile communication device MS-B.

Figure 4:
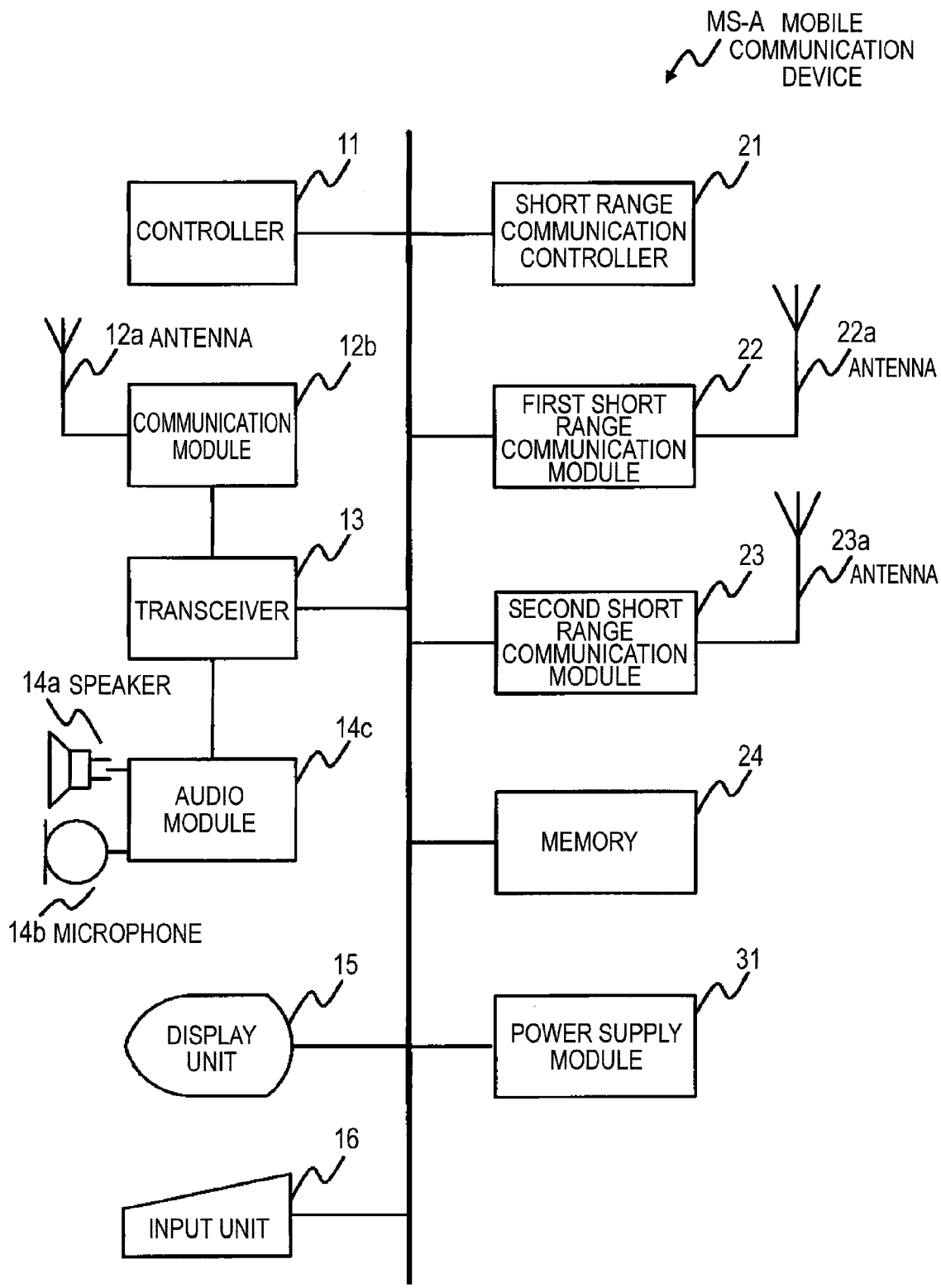
FIG. 4 is an exemplary block diagram showing a configuration of the mobile communication device.

FIG. 4 is a block diagram showing a configuration of the mobile communication device MS-A. The mobile communication device MS-A is a device for performing communication, etc. through a mobile communication network (not shown) like a portable phone, and includes a controller 11 for controlling the entire device and notifying information to each part of the device, an antenna 12a for transmitting/receiving a radio wave to/from a base station (not shown), a communication module 12b, a transceiver 13, a speaker 14a for generating reception voice, a microphone 14b for inputting transmission voice, an audio module 14c, a display unit 15, and an input unit 16.

The mobile communication device MS-A further includes a short range communication controller 21, a first short range communication module 22, an antenna 22a used for transmission/reception of a radio wave by the first short range communication module 22, a second short range communication module 23, an antenna 23a used for transmission/ reception of a radio wave by the second short range communication module 23, a memory 24, and a power supply module 31.

The memory 24 stores a folder and a file. The folder and the file are managed by a file management function of the controller 11. No restriction is imposed on information stored in the file. Thus, the file may be called an object, content, etc.

The memory 24 stores information indicating file attributes, for example, a file name and a file size (storage capacity required to store the file), and file types, for example, types of a text file, a still-image file of a JPEG system, a still-image file of a bitmap system, a motion-image file of an MPEG system, an audio file of an AAC system, an audio file of an MP3 system, etc., in addition to the file. The information indicating the file types may be stored as a file name extension and a file name part.

Figure 5:
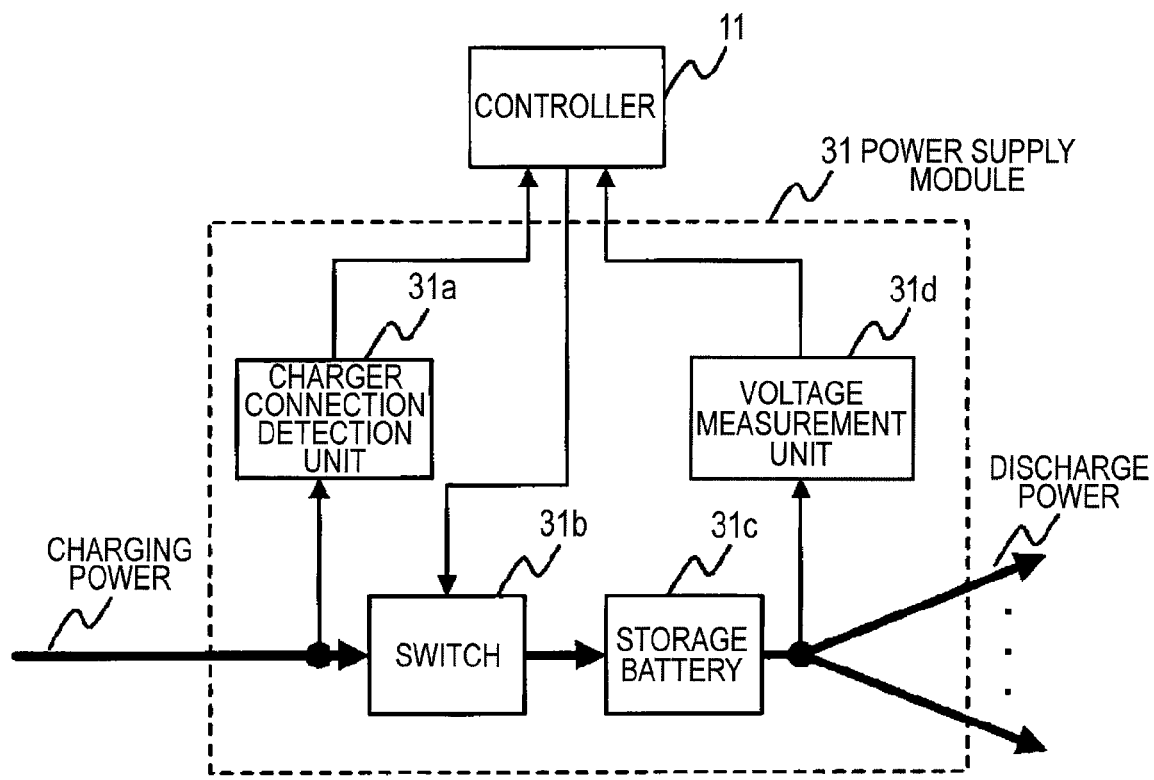
FIG. 5 is an exemplary block diagram showing a configuration of a power supply module according to an embodiment of the present invention.

FIG. 5 is a block diagram showing a detailed configuration of the power supply module 31. The power supply module 31 is connected to the controller 11. The power supply module 31 includes a charger connection detection unit 31a which is removably connected to a charger (not shown) through a connector (not shown) and gets charging power, a switch 31b to which charging power is supplied through the controller 11 and the connector, a storage battery 31c for contacting with each part of the mobile communication device MS-A and supplying discharge power to each part, and a voltage measurement unit 31d connected to the storage battery 31c and the controller 11.

The power is supplied from the charger to the switch 31b, from the switch 31b to the storage battery 31c, and from the storage battery 31c to each part in operation of the mobile communication device MS-A. In FIG. 5, a power supply flow is indicated by the thick line. Each part of the power supply module 31 is controlled by the controller 11.

The power supply module 31 may be configured with a primary battery, that is, a non rechargeable battery, instead of the storage battery 31c. In the case of this configuration, the power supply module 31 is not connected to the charger, and the charger connection detection unit 31a and the switch 31b are not required necessarily.

The operation of each part of the mobile communication device MS-A according to the embodiment of the present invention configured as described above will be described with reference to FIGS. 4 and 5. The communication module 12b outputs a high-frequency signal received by the antenna 12a to the transceiver 13. A high-frequency signal output from the transceiver 13 is transmitted from the antenna 12a.

The transceiver 13 amplifies, frequency-converts, and demodulates a high-frequency signal from the communication module 12b, acquires a digital signal thereby, outputs an acquired call voice signal to the audio module 14c, and outputs a control signal to the controller 11.

The transceiver 13 modulates, frequency-converts, and amplifies a digital signal, that is, a call voice signal output from the audio module 14c, and a control signal output from the controller 11, and acquires and outputs a high-frequency signal to the communication module 12b, thereby transmitting the high-frequency signal.

The audio module 14c converts a digital voice signal output from the transceiver 13 into an analog voice signal, and amplifies and outputs the analog voice signal to the speaker 14a. An analog voice signal output from the microphone 14b is amplified and converted into a digital voice signal and transmitted to the transceiver 13.

The display unit 15 is, for example, an LCD, and is controlled by the controller 11 and displays characters, numbers, and/or video data. Displayed data is switched by receiving a command from the controller 11 in response to an input operation from the input unit 16 and/or an incoming signal.

The input unit 16 is configured with keys including numeric keys for designating a telephone number of a communication counterpart or inputting a character, and a plurality of function keys. When a key of the input unit 16 is operated, an identifier of the key is notified to the controller 11. The controller 11 controls the mobile communication device MS-A according to the notified identifier of the key. For example, the controller 11 controls the display unit 15 to display a character.

The short range communication controller 21 controls the first short range communication module 22 and the second short range communication module 23, establishes a communication path with the mobile communication device MS-B of the communication counterpart through the short range communication network NW, and performs data transmission, specifically, file transmission and reception, in relation to the mobile communication device MS-B of the communication counterpart using the communication path.

Communication paths through the short range communication network NW are a communication path through the first short range communication module 22 and a communication path through the second short range communication module 23. When any one of the communication paths is established, it is assumed that a communication path through the short range communication network NW is established. To establish the communication path through the short range communication network NW, first, the communication path through the first short range communication module 22 is established. Then, the communication path through the second short range communication module 23 is established or not established.

The short range communication controller 21 mainly operates the first short range communication module 22 to establish the communication path and mainly operates the second short range communication module 23 to transmit data. After establishing the communication path, the short range communication controller 21 reduces electric energy to be consumed by the mobile communication device MS-A by controlling a release of the communication path without performing the data transmission.

The first short range communication module 22 performs communication of the NFC system and performs short range communication with the mobile communication device MS-B of the communication counterpart through a radio wave transmitted/received by the antenna 22a.

The mobile communication device MS-B of the communication counterpart is the same configuration as the mobile communication device MS-A, and has a communication module for performing the communication of the NFC system and an antenna connected to the communication module. The strength of a radio wave transmitted from the antenna 22a is a level at which NFC system communication with the mobile communication device MS-B is possible only when a distance between the antenna 22a and the antenna of the mobile communication device MS-B is short, for example, within several centimeters, and the directivity of the antenna 22a faces the directivity of the antenna of the communication device MS-B. Power consumption by communication of the first short range communication module 22 is reduced by shortly setting a communicable range to the level.

In a waiting time, the first short range communication module 22 receives a radio wave received by the antenna 22a without consuming power. Thus, when an establishment request of a communication path through the short range communication network NW is received from the mobile communication device MS-B, an establishment process of the communication path by the first short range communication module 22 is performed in response to the request and the establishment of the communication path is reported to the short range communication controller 21 by mutually transmitting/receiving an identifier, etc. required for communication through the second short range communication module 23.

According to a communication path establishment command from the short range communication controller 21, the first short range communication module 22 requests the mobile communication device MS-B to establish the communication path with the mobile communication device MS-B through the short range communication network NW by transmitting a radio wave from the antenna 22a. An establishment process of the communication path by the first short range communication module 22 is performed and the establishment of the communication path is reported to the short range communication controller 21. And the first short range communication module 22 transmits and receives an identifier, etc. required for communication through the second short range communication module 23.

The communication path establishment is regardless of whether it is caused by a request using a radio wave received by the antenna 22a or whether it is caused by a command of the short range communication controller 21. The communication path through the short range communication network NW is established by the establishment process of the communication path of the first short range communication module 22. Upon the establishment of the communication path, the transmission/reception of information required for the establishment of the communication path through the second short range communication module 23 is completed.

After the establishment of the communication path, the first short range communication module 22 performs communication using the established communication path under control of the short range communication controller 21. When a radio wave is transmitted from the antenna 22a, the first short range communication module 22 consumes power (active type), but is not limited thereto.

When the communication path is established due to a command of the short range communication controller 21, the first short range communication module 22 consumes power upon transmission of a radio wave from the antenna 22a. On the other hand, when the communication path is established due to a request by a radio wave received by the antenna 22a, information is transmitted by modulating a reflection wave of a radio wave received by the antenna 22a and power may not be consumed (passive type).

The second short range communication module 23 transmits/receives a radio wave using the antenna 23a and performs communication by an Ultra Wide Band (UWB) system using an ultra wide band radio wave of several gigahertz. Communication using the UWB system can have a higher rate than communication by the first short range communication module 22. On the other hand, its power consumption is higher than power consumption by the first short range communication module 22. However, the communication by the UWB system has lower power consumption as compared to communication of other systems in which high-rate communication is possible at the same level.

The mobile communication device MS-B of the communication counterpart has the same configuration as the mobile communication device MS-A and has a communication module for performing communication of the UWB system and an antenna connected to the communication module. The strength of a radio wave transmitted from the antenna 23a is a level at which UWB system communication with the mobile communication device MS-B is possible when a distance between the antenna 23a and the antenna connected to the above-described communication module of the mobile communication device MS-B is short, for example, within several centimeters, and the directivity of the antenna 23a faces the directivity of the antenna connected to the above-described communication module.

The communicable range by the second short range communication module 23 is the same as the communicable range by the first short range communication module 22. Here, the same communicable range is the same level as the communicable range by the first short range communication module 22 and also means that it includes the communicable range by the first short range communication module 22.

Power consumption by communication of the second short range communication module 23 can be reduced by setting a narrow communicable range for communication of the UWB system. There is an advantage in that a device user does not need to care about whether the short range communication is performed by the first short range communication module 22 or by the second short range communication module 23.

In other words, the mobile communication device MS-A performs the short range communication by selecting a proper one of the first short range communication module 22 and the second short range communication module 23 or switching to a proper one. On the other hand, the device user can enjoy the effect of short range communication by the proper one selected or switched by the device without being aware of whether the short range communication is made by any one of the first short range communication module 22 and the second short range communication module 23.

The device user involuntarily detects that the communicable range between the mobile communication device MS-A and the mobile communication device MS-B of the communication counterpart is identical, regardless of whether the short range communication is performed by the first short range communication module 22 or the second short range communication module 23. When a communication device other than the mobile communication device MS-B is in a range from the mobile communication device MS-A, it can be properly detected whether there is a risk of interception of a radio wave, thereby minimizing a risk of information leakage.

The second short range communication module 23 establishes a communication path using information required to establish the communication path transmitted and received by the first short range communication module 22 and performs communication under control of the short range communication controller 21 using the established communication path. Before an operation for establishing the communication path starts, the second short range communication module 23 does not operate, such that the second short range communication module 23 does not consume power.

The operation of the power supply module 31 will be described with reference to FIG. 5. The charger connection detection unit 31a measures a voltage of charging power supplied through the connector from the charger. It is detected whether or not the charger is connected to the power supply module 31.

That is, the charger connection detection unit 31a starts an operation according to a command from the controller 11, detects that the charger is connected when the measured voltage is a voltage equal to or greater than a threshold rechargeable voltage threshold, and detects that the charger is not connected when the voltage is less than the threshold. Whether or not the charger is connected is reported to the controller 11.

The switch 31*b* starts an operation according to a start signal from the controller 11 and makes an electric disconnection or application between a terminal (not shown) of charging power to be supplied through the connector from the charger and the storage battery 31*c*. When electric energy stored in the storage battery 31*c* is less than or equal to a predetermined threshold and it is detected that the charger is connected, the switch 31*b* under goes application control by the controller 11. Except for the case, it undergoes disconnection control by the controller 11.

When the charger is connected and the switch 31*b* is applied, the storage battery 31*c* charges direct current charging power of a predetermined voltage supplied from the charger. The storage battery 31*c* supplies discharge power to each part in operation in the mobile communication device MS-A.

The voltage measurement unit 31*d* starts an operation according to a start signal from the controller 11 and measures a voltage supplied by the storage battery 31*c*. The measured voltage is reported to the controller 11. The voltage measured by the voltage measurement unit 31*d* is used to measure, that is, estimate, electric energy stored in the storage battery 31*c* by the controller 11. The measured electric energy is used by the controller 11 and by each part of the device.

The electric energy stored in the storage battery 31*c* is not limited to estimation by measurement of a voltage supplied by the storage battery 31*c*. The power supply module 31 can measure electric energy stored in the storage battery 31*c* by measuring electric energy charged in the storage battery 31*c* and electric energy discharged from the storage battery 31*c*. For this measurement, for example, the power supply module 31 has a dedicated circuit for measuring electric energy and a dedicated circuit for computing a difference between two electric energy values.

Hereinafter, a process of the short range communication controller 21 for reducing electric energy to be consumed until short range communication ends in the mobile communication device MS-A according to the embodiment of the present invention will be described.

(File Transmission Based on a Command from the Controller 11)

Figure 6:
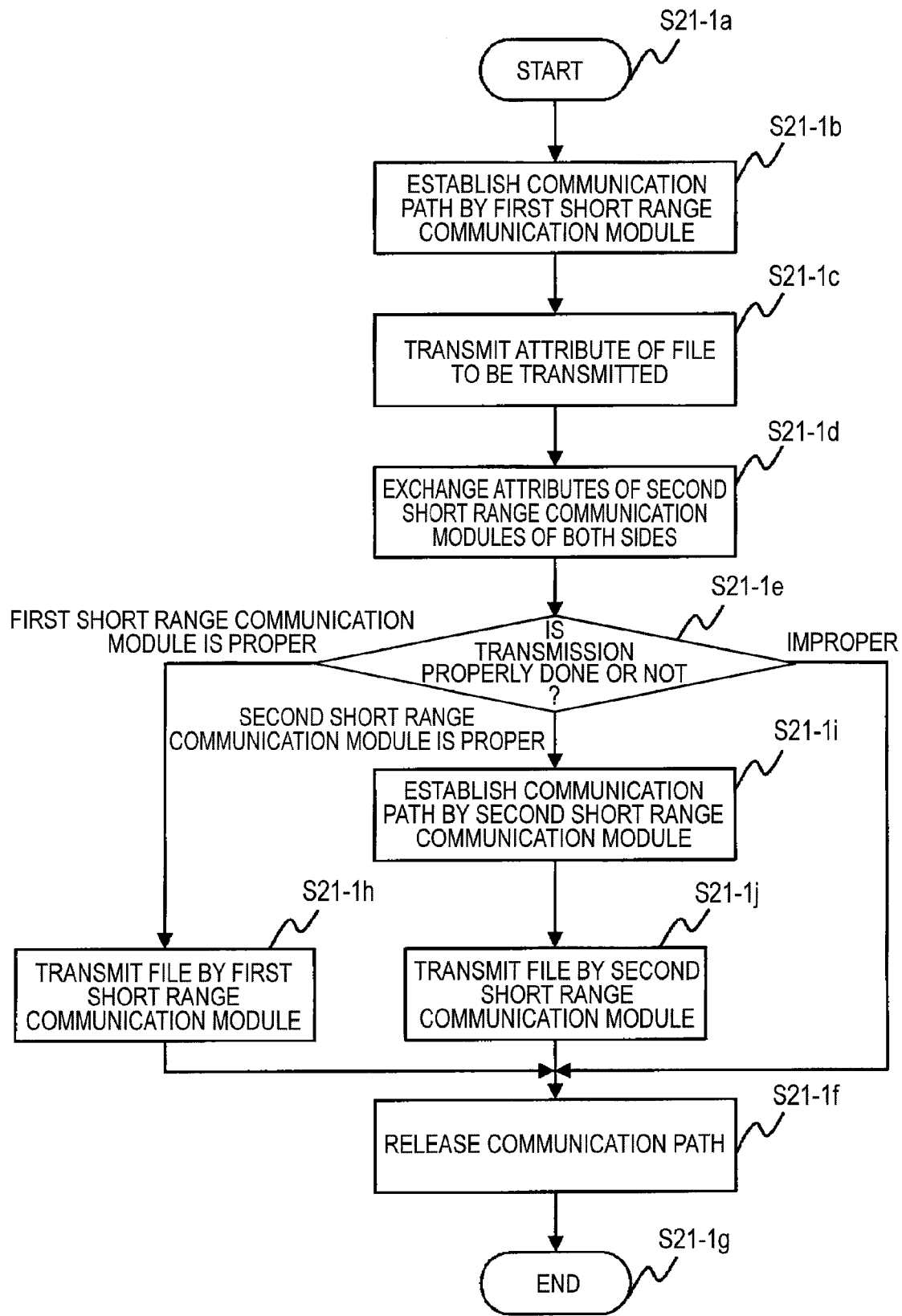
FIG. 6 is an exemplary flowchart of an operation in which a short range communication controller according to an embodiment of the present invention causes a file to be transmitted based on a command from a controller.

The short range communication controller 21 transmits a file stored in the memory 24 to the mobile communication device MS-B by controlling the first short range communication module 22 and the second short range communication module 23 based on a command from the controller 11 resulting from a predetermined key operation of the input unit 16. FIG. 6 shows a flowchart of an operation in which the short range communication controller 21 causes a file to be transmitted based on a command from the controller 11.

The short range communication controller 21 starts an operation for transmitting a file according to a command from the controller 11 (step S21-1*a*). With this command, a name of the file to be transmitted is assigned from the controller 11. The file name is based on a certain key operation at the input unit 16 or the name is preset.

The short range communication controller 21 operates the first short range communication module 22 and establishes a communication path by the first short range communication module 22 (step S21-1*b*). Before operating the first short range communication module 22, the short range communication controller 21 controls the display unit 15 to display a prompt for users to place the mobile communication device MS-A and the mobile communication device MS-B with the mark MS1*a* printed on the upper body MS1 of the mobile communication device MS-A and the mark MS1*a* printed on the upper body MS1 of the mobile communication device MS-B faced each other within a distance of several centimeters and to stop moving the two devices.

The establishment operation of the communication path is performed as follows. That is, the short range communication controller 21 first causes the first short range communication module 22 to set up a session with the mobile communication device MS-B. Next, the short range communication controller 21 causes the first short range communication module 22 to exchange information required for session setup by the second short range communication module 23, for example, identification information of the second short range communication module 23, etc., with the mobile communication device MS-B through the setup session, that is, to transmit and receive it thereto and therefrom. With the establishment operation of the communication path, power is supplied to the first short range communication module 22.

For example, the above-described session setup corresponds to a Connect command in an OBject EXchange (OBEX) protocol. Information transmission and information reception as described above and below correspond to a Put command and a Get command in the OBEX protocol, respectively.

When transmission and reception of an object of a vObject format are defined in the OBEX protocol, the information transmission and the information reception can be made by transmission and reception of an object of the format. All communications are performed according to a certain low-level protocol without being limited to the session setup. According to the protocol, for example, transmission of information of a packet unit and transmission of a response packet indicating normal reception to the transmission are performed repeatedly. However, the present invention does not depend upon the low-level protocol, and a description of the protocol is omitted.

The short range communication controller 21 searches a file by a name of a file, reads an attribute of the file from the memory 24, and causes the first short range communication module 22 to transmit the attribute to the mobile communication device MS-B (step S21-1*c*), and exchanges an attribute of the second short range communication module 23 with the mobile communication device MS-B, that is, transmits and receives it (step S21-1*d*). The attribute of the second short range communication module 23 is a communication rate of the second short range communication module 23. Here, the communication rate is preferably an effective rate, but may be a highest rate.

The short range communication controller 21 determines whether transmission of a file to be transmitted is properly done or not (step S21-1*e*). The determination is executed using the file attribute read in step S21-1*c*, the communication rate of the second short range communication module 23 of the mobile communication device MS-B received in step S21-1*d*, the communication rate of the second short range communication module 23 of the local device, the electric energy stored in the storage battery 31*c* measured by the controller 11, and the information transmitted through the first short range communication module 22 from the mobile communication device MS-B. The determination operation of step S21-1*e* will be described in detail later.

When the file transmission is determined to be improper, the short range communication controller 21 does not transmit the file. When the communication path by the first short range communication module 22 established in step S21-1*b* and the communication path by the second short range communication module 23 are established, the communication path is released (step S21-1f) and the file transmission operation ends according to a command from the controller 11 (step S21-1g). According to the communication path release of step S21-1f, the first short range communication module 22 and the second short range communication module 23 end the operation, such that power supply to the communication modules is stopped.

When the file transmission is determined to be improper, it means that the short range communication controller 21 reduces electric energy to be consumed by the first short range communication module 22 and the second short range communication module 23 by properly determining a possibility that communication through the short range communication network NW does not end normally and preventing the file transmission.

On the other hand, when the file transmission by the first short range communication module 22 is determined to be proper, the short range communication controller 21 transmits the above-described file using the first short range communication module 22 (step S21-1h) and moves to an operation for releasing the communication path of step S21-1f. The file transmission includes the file attribute transmission.

On the other hand, when the file transmission by the second short range communication module 23 is determined to be proper, the short range communication controller 21 causes the second short range communication module 23 to establish a communication path based on information required for session setup by the second short range communication module 23 exchanged in the operation of step S21-1b (step S21-1i).

It causes the second short range communication module 23 to transmit the above-described file (step S21-1j) and moves to a communication path release operation of step S21-1f. The file transmission includes the file attribute transmission. With this operation of the second short range communication module 23, power is supplied to the second short range communication module 23 and power supply to the first short range communication module 22 is stopped.

The determination operation of step S21-1e will be described in detail. In the following cases, the short range communication controller 21 determines that file transmission is not properly done. The first case is the case where a notification indicating that the mobile communication device MS-B does not receive a file is received from the mobile communication device MS-B. The second case is the case where electric energy required for file transmission exceeds electric energy stored in the storage battery 31c measured by the controller 11 even when the transmission is performed by the first short range communication module 22 or the second short range communication module 23. When the file transmission is determined not to be properly done in the second case, the short range communication controller 21 causes a notification indicating that the file transmission is not properly done to be transmitted to the mobile communication device MS-B.

Here, since the electric energy required for the file transmission in the case where the transmission is performed by the first short range communication module 22 is less than that in the case where the transmission is performed by the second short range communication module 23, the short range communication controller 21 computes the electric energy in the case where the transmission is performed by the first short range communication module 22 and uses the computed electric energy to determine whether or not the file transmission is properly done.

This electric energy is computed as a product of a computed time required for file transmission by a communication rate of the first short range communication module 22 and electric energy to be consumed in a unit time by a transmission operation of the first short range communication module 22.

On the other hand, in the following cases, the short range communication controller 21 determines that the file transmission by the first short range communication module 22 is properly done without determining that the file transmission is not properly done. The first case is the case where a notification indicating that the file reception is performed by the first short range communication module 22 is received from the mobile communication device MS-B and the case where information required for session setup by the second short range communication module 23 is not received from the mobile communication device MS-B (see the operation of step S21-1b).

The second case is the case where electric energy required for the file transmission exceeds electric energy stored in the storage battery 31c measured by the controller 11 when the transmission is performed by the second short range communication module 23. The third case is the case where it is determined that communication by the second short range communication module 23 is not smooth. For example, since a ultra wide band radio wave is used, there is a possibility that the communication by the second short range communication module 23 is not smooth due to a radio wave as noise. The case where the above-described communication is not smooth includes the case where the mobile communication device MS-A does not have the second short range communication module 23.

When the file transmission by the first short range communication module 22 is determined to be properly done in the second and third cases, the short range communication controller 21 causes a notification indicating that the file transmission is performed by the first short range communication module 22 to be transmitted to the mobile communication device MS-B.

Here, electric energy required in the case where the file transmission is performed by the second short range communication module 23 is computed as a product of a computed time required for the file transmission to be performed by a lower rate between a communication rate of the second short range communication module 23 of the mobile communication device MS-B and a communication rate of the second short range communication module 23 of the local device and electric energy to be consumed in a unit time by the transmission operation of the second short range communication module 23.

On the other hand, without receiving a notification indicating that the file transmission is improper or a notification indicating that the file reception is performed by the first short range communication module 22 from the mobile communication device MS-B during the passage of a threshold time, the short range communication controller 21 determines that the file transmission by the second short range communication module 23 is proper when the file transmission is not determined improper and the file transmission by the first short range communication module 22 is not determined to proper.

Instead, without receiving the above-described notification from the mobile communication device MS-B during the passage of the threshold time, the short range communication controller 21 can determine that the file transmission by the second short range communication module 23 is proper by receiving a notification indicating that the file reception is performed by the second short range communication module 23 from the mobile communication device MS-B. The short range communication controller 21 can transmit a notification indicating that the file transmission by the second short range communication module 23 is proper to the mobile communication device MS-B.

In the case of the determination operation of step S21-1e, the short range communication controller 21 can entrust the determination to a predetermined key operation of the input unit 16. The determination is displayed on the display unit 15 and the determination can be corrected according to a predetermined key operation of the input unit 16 in response to the display. For example, after the short range communication controller 21 determines that the file transmission by the first short range communication module 22 is proper, the short range communication controller 21 causes the display unit 15 to display its notification and a time required for the transmission.

When the device user shows a notification indicating that transmission is not performed for a long time using a key operation, the short range communication controller 21 determines that the file transmission is improper. When a notification indicating that the transmission must be performed by the second short range communication module 23 is shown by a key operation, regardless of electric energy stored in the storage battery 31c, the short range communication controller 21 determines that the file transmission by the second short range communication module 23 is proper.

When a problem occurs in short range communication during the file transmission, the short range communication controller 21 moves to the determination operation of step S21-1e and determines whether the transmission is properly done or not (not shown). When it is determined that a short range communication module different from a short range communication module (one of the first short range communication module 22 and the second short range communication module 23) in operation before the problem occurs is proper as a determination result, a handover is made. That is, transmission by the different short range communication module is performed from a part subsequent to a transmitted part before the problem occurs (not shown).

Upon transition to the determination operation of step S21-1e during the file transmission, the short range communication controller 21 can make the determination by referring to information acquired by the file transmission. For example, a time required for the file transmission can be computed by an actually measured communication rate. The above-described handover operation is also common between operations of all short range communication controllers 21 thereafter.

In the above description, the short range communication controller 21 establishes the communication path of the second short range communication module 23 in step S21-1i, but is not limited thereto. When the communication path of the first short range communication module 22 is established in step S21-1b, the communication path of the second short range communication module 23 is established. The file transmission of step S21-1j can be made without the communication path establishment operation of step S21-1i.

The communication path of the second short range communication module 23 to be performed in step S21-1b is established without communication by the second short range communication module 23. In the case of an example of the OBEX protocol, the Connect command is output by the first short range communication module 22 and the second short range communication module 23 outputs the Put command and the Get command in step S21-1j without outputting the Connect command.

When the communication path of the first short range communication module 22 is established, the communication path of the second short range communication module 23 is established, since the first short range communication module 22 and the second short range communication module 23 perform communication according to a common protocol, for example, the OBEX protocol, such that there is an advantage in that the above-described handover process can be simplified, that is, electric energy to be consumed can be reduced. When the communication path of the first short range communication module 22 is established, the communication path of the second short range communication module 23 can be established, which is common between operations of all short range communication controllers 21 thereafter.

On the other hand, the first short range communication module 22 and the second short range communication module 23 are not limited to the common protocol. According to characteristics of communication systems to be used respectively, communication can be performed using different protocols. The first short range communication module 22 and the second short range communication module 23 can perform communication using different protocols, which is common between operations of all the short range communication controllers 21 thereafter.

In the above description, the short range communication controller 21 performs an operation for exchanging an attribute of the second short range communication module 23 in step S21-1d after a transmission operation of an attribute of a file to be transmitted in step S21-1c, but is not limited thereto. A sequence of the two operations can be reversed.

As a part of an operation for exchanging information required for session setup by the second short range communication module 23, the operation for exchanging the attribute of the second short range communication module 23 can be performed in the operation of step S21-1b. A sequence of performing an operation for exchanging the attribute of the second short range communication module 23 does not need to be uniquely set, which is common between operations of all the short range communication controllers 21 thereafter.

Here, electric energy required for the file transmission in the case of the transmission by the first short range communication module 22 is less than that in the case of the transmission by the second short range communication module 23. On the other hand, when electric energy required for the file transmission in the case of the transmission by the first short range communication module 22 is greater than that in the case of the transmission by the second short range communication module 23, an operation for determining whether the transmission is properly done or not in step S21-1e is corrected, such that it is preferable not to determine that the transmission by the first short range communication module 22 is proper.

This is because a transmission rate according to the first short range communication module 22 is lower than that according to the second short range communication module 23 and an advantage using the first short range communication module 22 is absent. When the required electric energy by the first short range communication module 22 is greater than that by the second short range communication module 23, an operation is common between operations of all the short range communication controllers 21 thereafter.

When it is determined that there is a problem in short range communication, regardless of an operation performed by the first short range communication module 22 or the second short range communication module 23, for example, when the strength of a received radio wave is lowered, a ratio of noise to a received radio wave signal is bad, and communication error occurrence is detected using redundancy information for detecting an error of received information, information is retransmitted according to a certain protocol.

The first short range communication module 22 and the second short range communication module 23 notify the short range communication controller 21 that the problem has occurred and the short range communication controller 21 controls the display unit 15 to display a prompt for users to place the mobile communication devices MS-A and the mobile communication device MS-B with the mark MS1a printed on the upper body MS1 of the mobile communication device MS-A and the mark MS1a printed on the upper body MS1 of the mobile communication device MS-B faced each other within a distance of several centimeters and to stop moving the two devices. When it is determined that there is a problem in short range communication, an operation is common between operations of all the short range communication controllers 21 thereafter.

In the above description, the number of files to be transmitted by the first short range communication module 22 and the second short range communication module 23 based on a control operation of the short range communication controller 21 is one, but is not limited to one. A plurality of files can be used. When determining whether the transmission is properly done or not in step S21-1e and determining whether the reception is properly done or not in step S21-2c to be described later, a plurality of files can be transmitted in the same operation by computing storage capacity required to store all files to be transmitted and a time required for transmission. As the determination result, some files are transmitted. When the plurality of files are transmitted (or received), an operation is common between operations of all the short range communication controllers 21 thereafter.

(File Reception Based on a Command from the Controller 11)

The short range communication controller 21 causes the first short range communication module 22 and the second short range communication module 23 to receive a file from the mobile communication device MS-B and causes the memory 24 to store the received file, based on a command resulting from a predetermined key operation of the input unit 16 or a command from the controller 11 to be performed upon power application of the mobile communication device MS-A.

Figure 7:
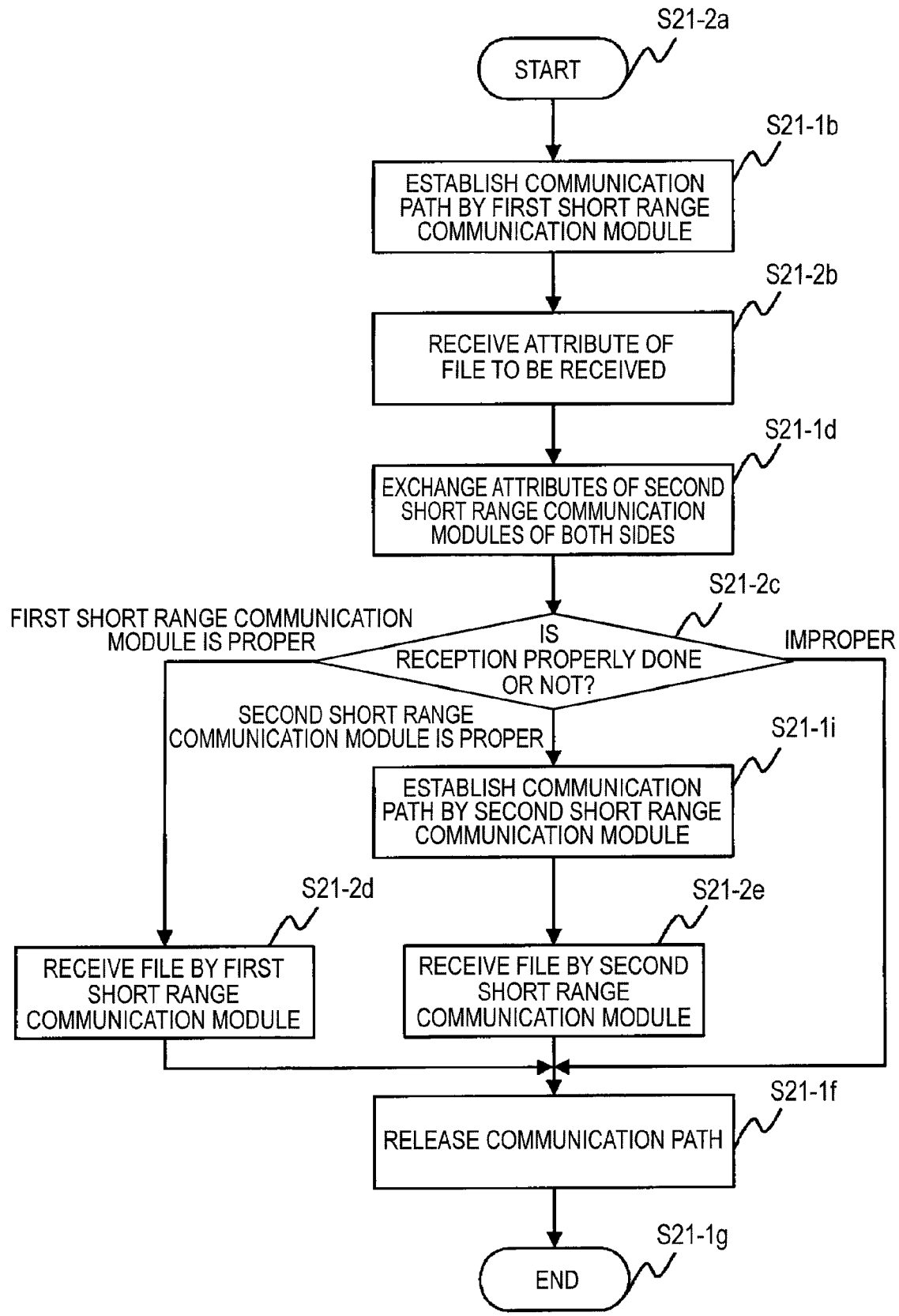
FIG. 7 is an exemplary flowchart of an operation in which the short range communication controller causes a file to be received based on a command from the controller.

FIG. 7 shows a flowchart of an operation in which the short range communication controller 21 causes a file to be received based on a command from the controller 11. Here, the same reference numeral is assigned to the same operation step as the step of the operation in which the short range communication controller 21 causes a file to be transmitted based on a command from the controller 11 described with reference to the flowchart of FIG. 6 and its description is omitted.

The short range communication controller 21 initiates operations according to a command from the controller 11 (step S21-2a). After the operation of the communication path establishment by the first short range communication module 22 in step S21-1b, an attribute of the reception file transmitted from the mobile communication device MS-B is received by the first short range communication module 22 (step S21-2b).

Then, an operation for exchanging an attribute of the second short range communication module 23 with the mobile communication device MS-B is performed in step S21-1d. Here, the file to be received is determined based on a certain key operation of the input unit 16 of the mobile communication device MS-A or determined based on presetting. As a part of the establishment of the communication path of step S21-1b, a name of the file is notified to the mobile communication device MS-B.

The short range communication controller 21 determines whether reception of a file whose attribute has been received in step S21-2b is properly done or not from the file attribute received in step S21-2b, the communication rate of the second short range communication module 23 of the mobile communication device MS-B received in step S21-1d, the communication rate of the second short range communication module 23 of the local device, the electric energy stored in the storage battery 31c measured by the controller 11, the state of the local device detected by the controller 11, and the information transmitted from the mobile communication device MS-B and received by the first short range communication module 22 (step S21-2c). The determination operation of step S21-2c will be described in detail later.

When the above-described file reception is determined to be improper, the short range communication controller 21 moves to an operation after the release of the communication path of step S21-1f without causing the file to be received, thereby reducing electric energy to be consumed by the first short range communication module 22 and the second short range communication module 23.

On the other hand, when the file reception by the first short range communication module 22 is determined to be proper, the short range communication controller 21 controls the first short range communication module 22 to receive the above-described file and causes the memory 24 to store the received file (step S21-2d), and moves to the operation to release the communication path of step S21-1f. The file reception includes the file attribute reception.

On the other hand, when the file reception by the second short range communication module 23 is determined to be proper, the short range communication controller 21 controls the second short range communication module 23 to receive the above-described file after an operation of step S21-1i for causing the second short range communication module 23 to establish the communication path, and causes the memory 24 to store the received file (step S21-2e), and moves to an operation of step S21-1f for releasing the communication path. The file reception includes the file attribute reception. As the second short range communication module 23 is operated, power is supplied to the second short range communication module 23.

The determination operation of step S21-2c will be described in detail. The short range communication controller 21 determines that the file reception is improper in the following cases. The first case is the case where a notification indicating that the file transmission by the mobile communication device MS-B is improper is received from the mobile communication device MS-B. The second case is the case where electric energy required for the file reception is greater than electric energy stored in the storage battery 31c measured by the controller 11 even when the reception is performed by the first short range communication module 22 and the second short range communication module 23.

The third case is the case where it is determined that a file to be received cannot be used by the mobile communication device. For example, this is the case where the file is a file of the MPEG system and the mobile communication device does not have a function for decoding the file of the MPEG system. The fourth case is the case where storage capacity for storing the file to be received does not remain in the memory 24. When the file reception is determined to be improper in the second to fourth cases, the short range communication controller 21 causes a notification indicating that the file reception is improper to be transmitted to the mobile communication device MS-B.

Here, the computation of electric energy required for file reception to be used to determine whether or not the file reception is improper uses electric energy to be consumed in a unit time by the file reception operation, instead of electric energy to be consumed in a unit time by the file transmission operation according to the computation of electric energy required for file transmission to be used to determine whether or not the file transmission is improper as described in the operation of step S21-1e.

On the other hand, the short range communication controller 21 determines that the file reception by the first short range communication module 22 is proper in the following cases, without determining that the file reception is improper. The first case is the case where a notification indicating that the file transmission is performed by the first short range communication module 22 is received from the mobile communication device MS-B and the case where information required for session setup by the second short range communication module 23 is not received from the mobile communication device MS-B (see the operation of step S21-1b).

The second case is the case where electric energy required for the file reception exceeds electric energy stored in the storage battery 31c measured by the controller 11 when the reception is performed by the second short range communication module 23. The third case is the case where it is determined that communication by the second short range communication module 23 is not smooth. For example, there is a possibility that the communication by the second short range communication module 23 is not smooth due to a radio wave as noise since an ultra wide band radio wave is used. The case where the communication is not smooth includes the case where the mobile communication device MS-A does not have the second short range communication module 23.

When the file reception by the first short range communication module 22 is determined to be proper in the second and third cases, the short range communication controller 21 causes a notification indicating that the file reception is performed by the first short range communication module 22 to be transmitted to the mobile communication device MS-B.

Here, electric energy required in the case where the file reception is performed by the second short range communication module 23 uses electric energy to be consumed in a unit time by the file reception operation, instead of electric energy to be consumed in a unit time by the file transmission operation computed according to required electric energy when the file transmission by the second short range communication module 23 is performed as described in the operation of step S21-1e.

On the other hand, without receiving a notification indicating that the file transmission is improper or a notification indicating that the file transmission is performed by the first short range communication module 22 from the mobile communication device MS-B during the passage of a predetermined time, the short range communication controller 21 determines that the file transmission by the second short range communication module 23 is proper when the file reception is not determined to be improper and the file reception by the first short range communication module 22 is not determined to be proper.

Instead, without receiving the above-described notification from the mobile communication device MS-B during the passage of the predetermined time, the short range communication controller 21 can determine that the file reception by the second short range communication module 23 is proper by receiving a notification indicating that the file transmission is performed by the second short range communication module 23 from the mobile communication device MS-B. The short range communication controller 21 can transmit a notification indicating that the file reception by the second short range communication module 23 is proper to the mobile communication device MS-B.

In the case of the determination operation of step S21-2c, the short range communication controller 21 can entrust the determination to a predetermined key of the input unit 16, the determination can be displayed on the display unit 15, and the determination can be corrected according to a predetermined key operation of the input unit 16 in response to the display, which has been described in the operation description of step S21-1e.

(File Transmission Based on a Request Received by the First Short Range Communication Module 22)

The short range communication controller 21 causes a file stored in the memory 24 to be transmitted to the mobile communication device MS-B by operating the first short range communication module 22 and the second short range communication module 23 based on the request received by the first short range communication module 22.

FIG. 8 shows a flowchart of an operation in which the short range communication controller 21 causes a file to be transmitted based on a request received by the first short range communication module 22. Here, the same reference numeral is assigned to the same operation step as the step of the operation in which the short range communication controller 21 causes a file to be transmitted based on a command from the controller 11 as described with reference to the flowchart of FIG. 6, and its description is omitted.

The short range communication controller 21 starts an operation for transmitting a file by receiving a radio wave indicating a request of a file transmission by the first short range communication module 22 (step S21-3a), operates the first short range communication module 22 in response to the received request and establishes the communication path by the first short range communication module 22 (step S21-3b), and moves to an operation for transmitting an attribute of the file to be transmitted in step S21-1c. A subsequent operation is the same as the operation in which the short range communication controller 21 causes the file to be transmitted based on a command from the controller 11 as described with reference to the flowchart of FIG. 6.

Details of the establishment operation of the communication path of step S21-3b have been described in the operation description of step S21-1b with reference to FIG. 6, and their description is omitted. In relation to the operation for transmitting a file by receiving a radio wave indicating a request of file transmission by the first short range communication module 22, the file to be transmitted is transmitted from the mobile communication device MS-B as a part of the establishment of the communication path of step S21-3b.

(File Reception Based on a Request Received by the First Short Range Communication Module 22)

The short range communication controller 21 causes the file to be transmitted from the mobile communication device MS-B based on the request received by the first short range communication module 22, causes the file to be received by operating the first short range communication module 22 and the second short range communication module 23, and causes the memory 24 to store the received file.

FIG. 9 shows a flowchart of an operation in which the short range communication controller 21 causes a file to be received based on a request received by the first short range communication module 22. Here, the same reference numeral is assigned to the same operation step as the operation in which the short range communication controller 21 causes a file to be received based on a command from the controller 11 as described with reference to the flowchart of FIG. 7, and its description is omitted.

The short range communication controller 21 starts an operation for receiving a file by receiving a radio wave indicating a request of file reception by the first short range communication module 22 (step S21-4a) and operates the first short range communication module 22 in response to the received request and establishes the communication path by the first short range communication module 22 (step S21-4b).

The short range communication controller 21 moves to an operation for receiving an attribute of the file to be received in step S21-2b. A subsequent operation is the same as the operation in which the short range communication controller 21 causes the file to be received based on a command from the controller 11 as described with reference to the flowchart of FIG. 7. The establishment operation of the communication path of step S21-4b is the same as the establishment operation of the communication path of step S21-3b described with reference to FIG. 8, and its description is omitted.

In relation to the operation for receiving a file by receiving a radio wave indicating a request of file reception by the first short range communication module 22, the file to be received is transmitted from the mobile communication device MS-B as a part of the establishment of the communication path of step S21-4b.

FIG. 10 shows one example of a sequence of communication to be performed between the mobile communication device MS-A and the mobile communication device MS-B. This example is an example in which the short range communication controller 21 of the mobile communication device MS-A causes a file to be transmitted to the mobile communication device MS-B through the second short range communication module 23 according to a command of the controller 11.

The communication sequence will be described with reference to the flowchart of the operation in which the short range communication controller 21 causes a file to be transmitted based on a command from the controller 11 as shown in FIG. 6 and the flowchart of the operation in which the short range communication controller 21 causes a file to be received based on a request received by the first short range communication module 22 as shown in FIG. 9.

After a start (T1) of communication by the first short range communication module 22, the short range communication controller 21 of the mobile communication device MS-A establishes the communication path by the first short range communication module 22 according to reception (T2) of a communication start response received from the first short range communication module 22 of the mobile communication device MS-B. A sequence of T1 and T2 corresponds to the operation of step S21-1b of FIG. 6 and the operation of step S21-4b of FIG. 9.

Thereafter, the short range communication controller 21 of the mobile communication device MS-A determines that the file is transmitted to the second short range communication module 23, after transmission (T3) of a message for starting the second short range communication module 23 by the first short range communication module 22 and reception (T4) of a response indicating that the second short range communication module 23 has started from the first short range communication module 22 of the mobile communication device MS-B, the communication path by the second short range communication module 23 is established.

A sequence of T3 and T4 correspond to the operation of step S21-1i of FIG. 6 and the operation of step S21-1i of FIG. 9. Communication of T1 to T4, described above, is performed by the first short range communication module 22.

Next, the short range communication controller 21 of the mobile communication device MS-A causes a file to be transmitted (T7) to the second short range communication module 23 through reception (T6) of a communication start response transmitted from the second short range communication module 23 of the mobile communication device MS-B after a communication start (T5) of the second short range communication module 23. A sequence of T5 to T7 corresponds to the operation of step S21-1j of FIG. 6 and the operation of step S21-2e of FIG. 9. Communication of T5 to T7 is performed by the second short range communication module 23.

In the short range communication regardless of the operation performed by the first short range communication module 22 or the second short range communication module 23, addition of redundancy information, detection and correction of a communication error, information retransmission upon occurrence of a communication error incapable of being corrected, etc. are performed according to a certain protocol. Information to be communicated may be encrypted.

In the short range communication between communication devices to which the present invention as described above has been applied in relation to the encryption, two communication devices for performing communication need to be placed at a distance within several centimeters and to face each other at a certain angle. Therefore, the secrecy of communication is high and the necessity of high encryption is low. As the high encryption is not performed, an advantage of a high-speed process of a communication device and an advantage of reducing power consumption of the device are achieved.

In the above description, the antenna 22a to be used by the first short range communication module 22 and the antenna 23a to be used by the second short range communication module 23 are separate antennas, but are not limited thereto. According to control of the short range communication controller 21, one antenna can be shared and connected to any one of the first short range communication module 22 and the second short range communication module 23. Even when one antenna is used by any one of the first short range communication module 22 and the second short range communication module 23, the directivity is easily set the same direction.

In the above description, a file to be transmitted/received is determined by a mobile communication device of a side at which file transmission/reception is started by the controller 11, but is not limited thereto. The file can be determined by a mobile communication device of a side transmitting/receiving the file based on a request received by the first short range communication module 22. The file can be determined by a mobile communication device of a side transmitting the file. Also, the file can be determined by a mobile communication device of a side receiving the file.

The short range communication controller 21 of the mobile communication device to determine a file to be transmitted/received can request a communication counterpart device to transmit a file list stored in the communication counterpart device and determine a file to be transmitted/received by referring to the list. This determination can depend upon selection of a device user according to a predetermined key operation of the input unit 16 in a state in which the list is displayed on the display unit 15. For example, the transmission/reception of the file list is performed as a part of the establishment operation of the communication path of the first short range communication module 22 of step S21-1*b*, step S21-3*b*, and step S21-4*b* or after the establishment is completed.

In the above description, a communication type by short range communication between communication devices is file transmission/reception, but is not limited thereto. For example, the communication type may be transmission/reception for reproducing streaming of image content data and/or audio content data.

The above description has been given by an example of applying the present invention to a mobile communication device, but, of course, the present invention can be applied to all devices for performing short range communication, for example, a personal computer, a PDA, etc. In particular, it is proper for a device operating at power stored in a battery, that is, a device of which reduction of power consumption is strongly desired, as a portable type.

In the above description, both communication by the first short range communication module 22 and communication by the second short range communication module 23 cause directivities of the antenna 22*a* and the antenna 23*a* to be faced each other and are possible between two devices placed within a predetermined distance, for example, several centimeters, but, of course, the predetermined distance can be changed depending upon a device to which the present invention is applied.

In the above description, the first short range communication module 22 performs communication of the NFC system, but is not limited to the communication of the NFC system. For example, a configuration for performing communication by infrared light is possible. In the case of this configuration, the mobile communication device MS-A has a light emitter and a light receiver instead of the antenna 22*a*. The directivity of the infrared light conforms to the directivity of the antenna 22*a*. The present invention is not limited to the above configuration, and may be modified variously.

What is claimed is:

1. A communication device for communicating with a counterpart communication device that is located within a communicable range, the communication device comprising:
    a first short range communication module configured to perform short range communication in a short range communication network between the communication device and the communication counterpart device;
    a second short range communication module configured to perform short range communication in the short range communication network between the communication device and the counterpart communication device, the second short range communication module being higher in communication rate and power consumption than the first short range communication module; and
    a short range communication controller connected to the first short range communication module and the second short range communication module and being configured to:
        control the first short range communication module to exchange information with the counterpart communication device, and receive rate information of the second short range communication module of the counterpart communication device from the counterpart communication device;
        determine whether to cause a file to be transmitted between the counterpart device and the second short range communication module based on the rate information received from the counterpart communication device and electric energy stored in a battery; and
        control the second short range communication module to receive or transmit the file from or to the counterpart communication device based on said determining.

2. The communication device of claim 1, further comprising:
    a battery configured to store power for operating the communication device; and
    a measurement module connected to the battery and the short range communication controller, and being configured to measure electric energy stored in the battery,
    wherein the short range communication controller is configured to determine that the file transmission is not properly done (a) when the first short range communication module receives from the counterpart device a notification indicating that the file is not receivable or (b) when the electric energy is less than an electric energy required to transmit the file to the counterpart device through the second short range communication module.

3. The communication device of claim 1, further comprising:
    a battery configured to store power for operating the communication device; and
    a measurement module configured to measure electric energy stored in the battery, wherein the short range communication controller is configured to determine that the file reception is not properly done (a) when the first short range communication module receives from the counterpart device a notification indicating that the file is not transmittable, (b) when the electric energy is less than an electric energy required to receive the file from the counterpart device through the second short range communication module, (c) when there is no storage capacity required for storing the file, or (d) when the file is a content file that cannot be reproduced by the communication device.

4. The communication device of claim 1, further comprising:
    a first antenna connected to the first short range communication module and being configured to transmit/receive a radio wave; and
    a second antenna connected to the second short range communication module and being configured to transmit/receive a radio wave,
    wherein the first antenna and the second antenna have the same directivity.

5. The communication device of claim 1, wherein the first short range communication module and the second short range communication module share one antenna to transmit/receive a radio wave.

6. The communication device of claim 1, further comprising:
    a first antenna connected to the first short range communication module and being configured to transmit/receive a radio wave; and
    a second antenna connected to the second short range communication module and being configured to transmit/receive a radio wave,
    wherein the first antenna and the second antenna are arranged closely.

7. The communication device of claim 1, wherein the first short range communication module is configured to perform communication using a method based on Near Field Communication (NFC) and the second short range communication module is configured to perform communication using method based on Ultra Wide Band (UWB).

8. A communication device for communicating with a counterpart communication device that is located within a communicable range, the communication device comprising:
- a first short range communication module configured to perform short range communication in a short range communication network between the communication device and the communication counterpart device;
- a second short range communication module configured to perform short range communication in the short range communication network between the communication device and the counterpart communication device, the second short range communication module being higher in communication rate and power consumption than the first short range communication module;
- a short range communication controller connected to the first short range communication device and the second short range communication module and being configured to:
  - control the first short range communication module to communicate with the counterpart communication device to exchange information with the counterpart communication device; and
  - determine whether to use the first short range communication module or the second short range communication module to transmit a file to or receive the file from the counterpart communication device based on the information received from the counterpart communication device and electric energy stored in a battery, wherein the file is transmitted between the counterpart communication device and the one of the first short range communication module and the second short range communication module that is determined to be used.

9. The communication device of claim 8, further comprising:
- a battery configured to store power for operating the communication device;
- a measurement module connected to the battery and the short range communication controller, and being configured to measure electric energy stored in the battery,
- wherein the short range communication controller is configured to control the first short range communication module to transmit the file (a) when the first short range communication module receives from the counterpart device a notification indicating that the file is received through the first short range communication module or (b) when the electric energy is less than first electric energy and the electric energy is second electric energy or more, the first electric energy being electric energy required to transmit the file to the counterpart device through the second short range communication module, the second electric energy being electric energy required to transmit the file to the counterpart device through the first short range communication module.

10. The communication device of claim 8, further comprising:
- a battery configured to store power for operating the communication device;
- a measurement module connected to the battery and the short range communication controller, and being configured to measure electric energy stored in the battery,
- wherein the short range communication controller is configured to control the first short range communication module to receive the file (a) when the first short range communication module receives from the counterpart device a notification indicating that the file is transmitted through the first short range communication module or (b) when the electric energy is less than first electric energy and the electric energy is second electric energy or more, the first electric energy being electric energy required to receive the file to the counterpart device through the second short range communication module, the second electric energy being electric energy required to receive the file to the counterpart device through the first short range communication module.

11. The communication device of claim 8, further comprising:
- a first antenna connected to the first short range communication module and being configured to transmit/receive a radio wave; and
- a second antenna connected to the second short range communication module and being configured to transmit/receive a radio wave,
- wherein the first antenna and the second antenna have the same directivity.

12. The communication device of claim 8, wherein the first short range communication module and the second short range communication module share one antenna to transmit/receive a radio wave.

13. The communication device of claim 8, further comprising:
- a first antenna connected to the first short range communication module and being configured to transmit/receive a radio wave; and
- a second antenna connected to the second short range communication module and being configured to transmit/receive a radio wave,
- wherein the first antenna and the second antenna are arranged closely.

14. The communication device of claim 8, wherein the first short range communication module is configured to perform communication using a method based on Near Field Communication (NFC) and the second short range communication module is configured to perform communication using method based on Ultra Wide Band (UWB).

15. The communication device of claim 8, wherein the short range communication controller is configured to determine whether to cause the first short range communication module or the second short range communication module before and/or during the transmission of the file between the communication device and the counterpart device.

* * * * *